(12) United States Patent
Chu et al.

(10) Patent No.: US 9,309,799 B2
(45) Date of Patent: Apr. 12, 2016

(54) METHOD AND DEVICE FOR DETERMINING THE OXYGEN STORAGE CAPACITY OF AN EMISSION CONTROL SYSTEM

(71) Applicants: Siyun Chu, Ludwigsburg (DE); Matthias Kuentzle, Schwieberdingen (DE); Richard Holberg, Stuttgart (DE)

(72) Inventors: Siyun Chu, Ludwigsburg (DE); Matthias Kuentzle, Schwieberdingen (DE); Richard Holberg, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/164,490

(22) Filed: Jan. 27, 2014

(65) Prior Publication Data

US 2014/0208718 A1 Jul. 31, 2014

(30) Foreign Application Priority Data

Jan. 25, 2013 (DE) .......................... 10 2013 201 228

(51) Int. Cl.
*F01N 3/00* (2006.01)
*F01N 11/00* (2006.01)
*F01N 3/08* (2006.01)

(52) U.S. Cl.
CPC ................ *F01N 11/007* (2013.01); *F01N 3/08* (2013.01); *F01N 2560/025* (2013.01); *F01N 2560/14* (2013.01); *F01N 2900/1624* (2013.01); *Y02T 10/47* (2013.01)

(58) Field of Classification Search
CPC ..... F01N 3/2006; F01N 3/206; F01N 3/0864; F01N 9/00; F01N 9/005; F01N 9/007; F01N 11/00; F01N 13/011; F01N 2430/02; F01N 2430/06; F01N 2430/08; F01N 2560/025; F01N 2570/16; F01N 2900/1624; F01N 2900/0416; F01N 2900/0418; F01N 2900/0421; F01N 2900/0422

USPC .............................. 60/274, 276, 277, 285, 286
See application file for complete search history.

(56) References Cited

U.S. PATENT DOCUMENTS

| | | | | |
|---|---|---|---|---|
| 5,842,340 A * | 12/1998 | Bush et al. | ....................... | 60/274 |
| 6,546,719 B2 * | 4/2003 | Kamoto et al. | ................. | 60/285 |
| 6,694,243 B2 * | 2/2004 | Shi et al. | ....................... | 701/114 |
| 7,418,853 B2 | 9/2008 | Odendall | | |
| 7,900,439 B2 * | 3/2011 | Genslak et al. | ................. | 60/277 |
| 8,484,946 B2 * | 7/2013 | Arlt et al. | ........................ | 60/285 |
| 8,899,015 B2 * | 12/2014 | Sato | ............................... | 60/277 |
| 8,938,947 B2 * | 1/2015 | Nakamura | ...................... | 60/277 |

FOREIGN PATENT DOCUMENTS

| | | |
|---|---|---|
| DE | 103 31 334 | 2/2005 |
| DE | 10 2005 016 075 | 4/2007 |
| DE | 10 2011 003 493 | 8/2012 |

\* cited by examiner

*Primary Examiner* — Binh Q Tran
(74) *Attorney, Agent, or Firm* — Kenyon & Kenyon LLP

(57) ABSTRACT

A method and a device for determining the oxygen storage capacity of an emission control system in an exhaust duct of an internal combustion engine. In a first phase, the internal combustion engine being operated using an air-fuel mixture having a rich air-to-fuel ratio, and in a second phase, the engine being operated at a lean air-to-fuel ratio; and an oxygen storage capacity of the emission control system being determined from an oxygen input into the emission control system during the second phase; and/or in order to determine a hydrocarbon gas storage capacity, the internal combustion engine being operated during the first phase at a lean air-to-fuel ratio, and operated in the second phase at a rich air-to-fuel ratio; and the hydrocarbon gas storage capacity being determined from the oxygen discharge from the emission control system during the second phase.

9 Claims, 1 Drawing Sheet

METHOD AND DEVICE FOR DETERMINING THE OXYGEN STORAGE CAPACITY OF AN EMISSION CONTROL SYSTEM

CROSS REFERENCE

The present application claims the benefit under 35 U.S.C. §119 of German Patent Application No. DE102013201228.4 filed on Jan. 25, 2013, which is hereby incorporated by reference in its entirety.

BACKGROUND INFORMATION

The present invention relates to a method for determining the oxygen storage capacity of an emission control system in an exhaust duct of an internal combustion engine, having a first exhaust gas analyzer probe situated in front of the emission control system in a direction of flow and a second exhaust gas analyzer probe situated in back of the emission control system; in a first phase, the internal combustion engine being operated at an air-fuel mixture having a rich ($\lambda<1$) air-to-fuel ratio, and in a second phase, the engine being operated using a lean ($\lambda>1$) air-to-fuel ratio; and an oxygen storage capacity of the emission control system being determined from an oxygen input into the emission control system during the second phase; and/or in order to determine a hydrocarbon gas storage capacity, the internal combustion engine being operated during the first phase at a lean ($\lambda>1$) air-to-fuel ratio, and operated in the second phase at a rich ($\lambda<1$) air-to-fuel ratio; and the hydrocarbon gas storage capacity being determined from the oxygen discharge from the emission control system during the second phase.

The present invention further relates to a device for determining the oxygen storage capacity of an emission control system in an exhaust duct of an internal combustion engine, having a first exhaust gas analyzer probe situated in front of the emission control system in a direction of flow, a second exhaust gas analyzer probe situated in back of the emission control system, and an engine control unit assigned to the internal combustion engine; the engine control unit including a circuit or a program sequence, with the aid of which the air-fuel mixture supplied to the engine is controlled in such a manner, that in a first phase, the engine is operated using an air-fuel mixture having a rich ($\lambda<1$) air-to-fuel ratio and having, and in a second phase, the engine is operated at a lean ($\lambda>1$) air-to-fuel ratio, and that an oxygen storage capacity of the emission control system is determined from an oxygen input into the emission control system during the second phase, and/or that to determine a hydrocarbon gas storage capacity, the engine is operated during the first phase at a lean ($\lambda>1$) air-to-fuel ratio, and operated in the second phase at a rich ($\lambda<1$) air-to-fuel ratio; and the engine control unit including a program sequence for determining the hydrocarbon gas storage capacity from the oxygen discharge from the emission control system during the second phase.

To reduce the emissions in vehicles having spark ignition engines, three-way catalytic converters are normally used as emission control systems, which only convert unwanted products in the exhaust gas sufficiently, when air-to-fuel ratio $\lambda$ is adjusted with high precision. For this purpose, air-to-fuel ratio $\lambda$ is measured using an exhaust gas analyzer probe situated upstream from the emission control system. The storage capacity of such an emission control system for oxygen is utilized for taking up oxygen in lean phases and releasing it again in rich phases. By this means, oxidizable, harmful components of the exhaust gas may be converted. In this context, an exhaust gas analyzer probe positioned downstream from the emission control system is used for monitoring the oxygen storage capacity of the emission control system.

As the catalytic converter ages, its storage capacity for oxygen OSC (oxygen storage capacity) decreases. Due to this, sufficient oxygen for cleaning the exhaust gas of the harmful gas components may no longer be provided in the rich phases, and the exhaust gas analyzer probe in back of the catalytic converter detects these components to be oxidized. In addition, in relatively long, lean phases, this exhaust gas analyzer probe detects the oxygen that can no longer be stored by the catalytic converter.

In many countries, monitoring of the catalytic converter by the engine control unit during vehicle operation is stipulated by law (on-board diagnostics). In this context, active catalytic converter diagnostics have the task of detecting an unacceptable decrease in the conversion capacity of the catalytic converter, which may result in an unacceptable increase in the emission levels, and, for example, indicating it with the aid of a warning light and entering it in a fault storage means of the engine control unit.

A conventional diagnostic method for the conversion capacity is to determine the oxygen storage capacity of the catalytic converter, since experience shows that the conversion capacity also decreases with the storage capacity. In the case of active catalytic converter diagnostics within the scope of the on-board diagnostics (OBD), a forced excitation or precontrol of the air-to-fuel ratio establishes a rich-lean oscillation, which produces a maximum oxygen loading of the catalytic converter.

Conventionally, in a measuring phase for determining the oxygen storage capacity, it is assumed that the catalytic converter is either completely filled with oxygen or completely empty. If the measuring phase begins with a completely empty catalytic converter, it is acted upon by lean exhaust gas of a known lambda value until an exhaust gas analyzer probe at the outlet of the catalytic converter detects oxygen passing through. The amount of oxygen fed in then corresponds to the oxygen storage capacity (OSC). If the measuring phase begins with a completely filled catalytic converter, it is acted upon by rich exhaust gas of known lambda value until the exhaust gas analyzer probe at the outlet of the catalytic converter detects rich exhaust gas passing through. The amount of oxygen discharged then corresponds to the hydrocarbon gas storage capacity (RSC). In both cases, the exhaust gas at the outlet of the catalytic converter has a lambda value of 1, as long as the catalytic converter stores or gives off oxygen.

If one of the exhaust gas analyzer probes has a dynamic error and therefore reacts in a slow and/or delayed manner to a sudden change in lambda, then the determination of the oxygen storage capacity is also incorrect. In the case of a dynamic error of the exhaust gas analyzer probe in front of the catalytic converter, the oxygen input or discharge is determined to be too low. In the case of a dynamic error of the exhaust gas analyzer probe in back of the catalytic converter, the oxygen input or discharge is determined to be too high. With respect to a jump in lambda from lean to rich and a jump from rich to lean, the dynamic errors may be symmetric or asymmetric errors.

Thus, such a dynamic error may lead to a faulty catalytic converter being evaluated as correctly functioning or a correctly functioning catalytic converter being evaluated as faulty.

A further effect of one of the described dynamic errors is, that the evaluation of the oxygen storage capacity and that of the hydrocarbon gas storage capacity deliver different results. In the case of natural frequency control or in the case of offset diagnostics, the difference ascertained in this manner is interpreted as signal offset of the exhaust gas sensor in front of the catalytic converter. If the supposed signal offset is compensated for in the control, then, in the case of balanced lambda modulation, a shift in the average lambda value, and therefore, an increased value of unwanted exhaust gas components, are produced. The difference of the oxygen storage capacity and the hydrocarbon gas storage capacity is a function of the operating point. Therefore, the error after compensating for the supposed signal offset is also a function of the operating point. All in all, a difference between the oxygen storage capacity and the hydrocarbon gas storage capacity due to an asymmetric dynamic error must therefore be distinguished from an actual offset error of the exhaust gas sensor in front of the catalytic converter.

German Patent Application No. DE102011003493A1 describes a method for checking the operability of a catalytic converter in the exhaust system of an internal combustion engine; the catalytic converter being prepared, and an oxygen storage capacity of the catalytic converter being subsequently ascertained. The method is characterized in that an amount of oxygen supplied to the catalytic converter is continuously increased. German Patent Application No. DE102011003493A1 states that by slowly increasing the oxygen concentration in the exhaust gas for charging the catalytic converter, instead of increasing it abruptly, even oxygen sensors having a dynamic error can follow the signal without significant measuring error. In one specific embodiment, the rate of rise of the oxygen sensor be initially determined, and that the rate of rise of the oxygen concentration in the exhaust gas then be adjusted to it. No reference is made to taking into account the dynamic response of the oxygen sensor, using mathematical means, when determining the oxygen storage capacity.

German Patent Application No. DE102005016075B4 describes a method for diagnosing an oxygen sensor assigned to the exhaust duct of an internal combustion engine, which method is characterized in that in the case of a known first and second mass flow rate of exhaust gas through the exhaust gas catalytic converter, it is measured how large the specific time delay is until a jump in the lambda signal in front of the exhaust gas catalytic converter becomes apparent in the lambda signal of the oxygen sensor assigned to the exhaust gas catalytic converter, and based on the measured time delays, it is ascertained how large the proportion of the time delays dependent on the mass flow rate of exhaust gas and caused by the catalytic converter is, and how large the proportion of the time delays independent of the mass flow rate of exhaust gas and caused by the probe is; the proportion caused by the probe being used as a diagnostic criterion for the oxygen sensor. However, the document does not teach how a correct value of the oxygen input into a catalytic converter may be determined.

German Patent No. DE10331334A1 describes a method for operating an internal combustion engine, in particular, of a motor vehicle, having an exhaust gas aftertreatment system situated in an exhaust system of the engine, the exhaust gas aftertreatment system having at least one catalytic converter and a first oxygen sensor situated upstream from the catalytic converter and a second oxygen sensor situated downstream from the catalytic converter; in order to determine an oxygen storage capacity of the catalytic converter, in a first step, a lambda value in front of the catalytic converter being adjusted to a value less than 1 until oxygen stored in the catalytic converter is completely discharged, and in a second step, the lambda value in front of the catalytic converter being subsequently actively adjusted to a value greater than 1 until the catalytic converter is completely loaded with oxygen; the oxygen storage capacity of the catalytic converter being determined with the aid of an oxygen balance. The method is characterized in that during the determination of the oxygen storage capacity, at least one parameter of the oxygen sensors is simultaneously determined, and an operability of the exhaust gas analyzer probes is determined from the parameter. German Patent No. DE10331334A1 describes a method for temporally diagnosing the oxygen storage capacity of a catalytic converter and diagnosing the dynamic response of an oxygen sensor simultaneously. However, no correction of the determination of the oxygen storage capacity is described.

Therefore, an object of the present invention is to provide a method, by which the diagnosis of the oxygen storage capacity of an emission control system may be carried out with improved accuracy and with reduced dependence on dynamic errors of the exhaust gas analyzer probes used.

A further object of the present invention is to provide a device for implementing the method.

SUMMARY

An object of the present invention relating to the method may be achieved by determining parameters of a step response of an output signal of the first exhaust gas analyzer probe and/or of the second exhaust gas analyzer probe on the basis of a sudden change in the lambda value of the air-fuel mixture supplied to the engine, and by correcting the oxygen input and/or the oxygen discharge using the parameters of the step response. If the dynamic parameters of an exhaust gas analyzer probe are determined, a lambda characteristic may be calculated from the output signal of the exhaust gas analyzer probe, as would have been determined by a correctly functioning exhaust gas analyzer probe. With the aid of the lambda characteristic corrected in this manner, the oxygen input or discharge may be determined with improved accuracy.

Using the correction for the first exhaust gas analyzer probe and/or the second exhaust gas analyzer probe described by the present invention, the oxygen storage capacity and the hydrocarbon gas storage capacity may be correctly determined. In particular, in the case of an asymmetric dynamic error, an equality of oxygen storage capacity and hydrocarbon gas storage capacity may also be correctly determined. An offset error of the first exhaust gas analyzer probe in front of the emission control system is prevented from being erroneously deduced from the asymmetric dynamic error.

In a particularly suitable variant of the method, output signal $f(t)$ of the first exhaust gas analyzer probe and/or of the second exhaust gas analyzer probe is represented by a function of the form $f(t) \sim 1 - \exp((t-T)/\tau)$, and a delay $T$ and a time constant $\tau$ are determined as parameters of the step response. With the aid of the parameters ascertained in this manner, a lambda characteristic may be calculated from the output signal of the exhaust gas analyzer probe, as it would have been determined using a correctly functioning exhaust gas analyzer probe.

In one further refinement of the method, delay $T$ is divided up into a sum of a path delay $T_n$ and a probe delay $T_s$ and time constant $\tau$ is divided up into a sum of a path time constant $\tau_n$ and a probe time constant $\tau_s$; path delay $T_n$ and path time constant $\tau_n$ describing the dynamic response of conveying gas from the supply-air side of the engine to the exhaust gas analyzer probe; and probe delay $T_s$ and probe time constant $\tau_s$ describing the dynamic response of the exhaust gas analyzer probe. In this context, only probe delay $T_s$ and probe time constant $\tau_s$ are increased by a dynamic error of the exhaust gas analyzer probe. The representation as a sum relates to a simplification of a PT2($PT1_{path}*PT1_{probe}$) model to a PT1 ($PT1_{(path+probe)}$). This simplification is permissible, since in the case of an error, the path parameters are small compared with the probe parameters.

One further refinement of the method of the present invention provides that a correction of the oxygen input and/or of the oxygen discharge be calculated from a difference of the areas under a first function $f_1(t) \sim 1-\exp((t-T)/\tau)$ having the sum of delays $T_n+T_s$ and the sum of time constants $\tau_n+\tau_s$, and a second function $f_2(t) \sim 1-\exp((t-T)/\tau)$ having delay $T_n$ and time constant $\tau_n$. In this context, the area may be calculated by integration or summation. The area between the lambda=1 value and the value of the function at values greater than lambda=1 may be used for correcting the oxygen input. The determination of the oxygen discharge may also be improved in an analogous manner.

One way to simplify and accelerate the calculation according to the method provides that a time period from first reaching lambda=1 to three times the probe time constant $\tau_s$ be used for determining the area under the first and the second function. Ninety-five percent of the final value is reached after three times the probe time constant, which means that the oxygen input may be determined in a sufficiently accurate, reproducible and rapid manner. The determination of the oxygen discharge may also be improved in an analogous manner.

One form of the method provides that the beginning of the area determination for the first function $f_1(t)$ be designated as $$t_{ss} = (\tau_s + \tau_n) \cdot \ln\frac{h_0}{\Delta\lambda} + T_s + T_n,$$

and that the beginning of the area determination $t_{ns}$ for the second function $f_2(t)$ be designated as $$t_{ns} = \tau_n \cdot \ln\frac{h_0}{\Delta\lambda} + T_n,$$

where $h_0$ denotes the difference between the lambda value of the air-fuel mixture supplied to the engine during the first phase and lambda=1, and where $\Delta\lambda$ denotes the difference between the lambda value of the air-fuel mixture supplied to the engine during the first phase and the second phase.

In order to correct a dynamic error of the second exhaust gas analyzer probe positioned downstream from the emission control system, the method provides that a reaction time to an abrupt change in the lambda value of the air-fuel mixture supplied to the engine from lean to rich be determined as a parameter of the step response of the second exhaust gas analyzer probe, and that a time between falling below a first predetermined threshold value in the range above lambda=1 and falling below a second predetermined threshold value in the range below lambda=1 in response to an abrupt change in the lambda value of the air-fuel mixture supplied to the engine from lean to rich be determined as a time constant, and that the oxygen discharge be corrected using the reaction time and the time constant.

According to conventional methods, for the second exhaust gas analyzer probe positioned downstream from the emission control system, the delay between a lambda request of the first exhaust gas analyzer probe from "rich to lean" and the reaction of the output signal of the second exhaust gas analyzer probe may be used as reaction time (also delay time or delay) "rich to lean." In the same manner, reaction time "lean to rich" may be determined according to conventional methods.

A time constant "rich to lean" for the second exhaust gas analyzer probe positioned downstream from the emission control system may be determined according to conventional methods, by determining the time between the crossing of a defined threshold value in the rich range and the crossing of a threshold value in the lean one. A time constant "lean to rich" may also be determined in an analogous manner.

Using the values for reaction time and time constant for the second exhaust gas analyzer probe determined in this manner, the oxygen storage capacity may be corrected directly during the integration of the oxygen input. This method is called "close the gap." Now, the hydrocarbon gas storage capacity is also correctly determined according to the present invention. This is advantageous for systems, which use the difference between oxygen storage capacity and hydrocarbon gas storage capacity for controlling the second control loop of the lambda control, as is the case, for example, with natural frequency control.

An object of the present invention relating to the example method may be achieved in that a correction of the oxygen input and/or the oxygen discharge is determined in a first method step as a function of probe delay $T_s$ and probe time constant $\tau_s$ of the first exhaust gas analyzer probe, an average mass flow rate of exhaust gas, and a magnitude of a lambda increase of the air-fuel mixture supplied to the engine in the first phase and the second phase, and stored in characteristics maps; and that in a second method step, the correction of the oxygen input and/or the oxygen discharge during operation of the engine is taken from the characteristics maps. These variants of the method require little computational time.

An object of the present invention relating to the example device may be achieved in that a further circuit or program sequence for determining parameters of a step response of an output signal of the first exhaust gas analyzer probe and/or the second exhaust gas analyzer probe on the basis of a jump in the lambda value of the air-fuel mixture supplied to the engine is provided in the engine control unit; and that a program sequence for correcting the oxygen input and/or the oxygen discharge, using the parameters of the step response, is provided in the engine control unit.

Using the example method of the present invention and the associated example device, the oxygen input (OSC) and discharge (RSC) may also be correctly determined in the case of a dynamic error of the first exhaust gas analyzer probe positioned in front of the emission control system, and therefore, the RSC/OSC balancing may be used for control, adaptation, and for diagnostic purposes.

The present invention is explained in greater detail below, with reference to an exemplary embodiment shown in the figures.

DETAILED DESCRIPTION OF EXAMPLE EMBODIMENTS

Figure 1:
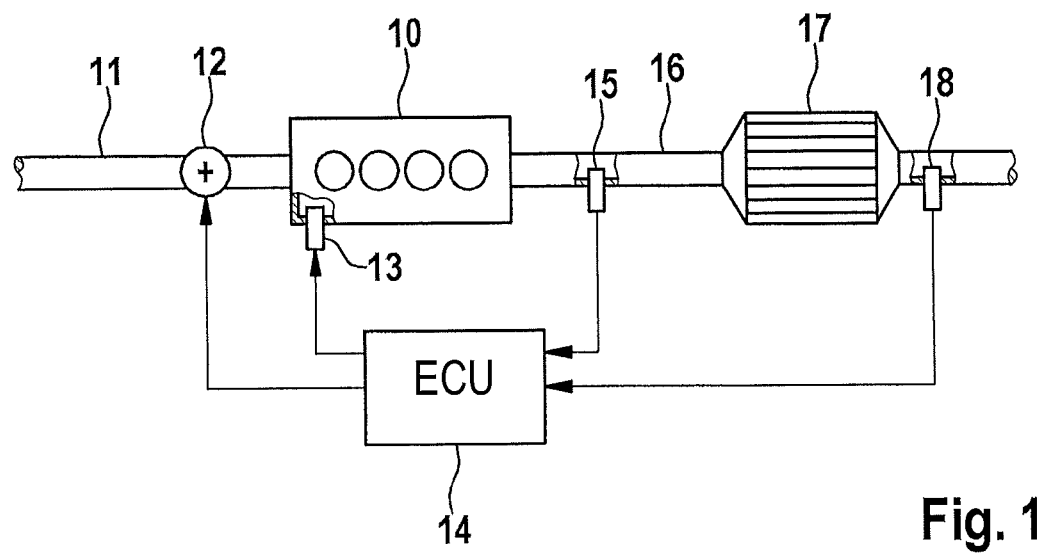
FIG. 1 shows a schematic view of the technical field in which the example method of the present invention may be used.

Using an example of a spark ignition engine, FIG. 1 schematically shows the technical field in which the example method of the present invention for determining the oxygen storage capacity of an emission control system 17 may be used. An internal combustion engine 10 is fed air via an air supply line 11, and its mass is determined by an air mass meter 12. Air mass meter 12 may take the form of a hot-film air mass meter. The exhaust gas of the internal combustion engine 10 is removed via an exhaust duct 16; emission control system 17 being provided in back of internal combustion engine 10 in the direction of flow of the exhaust gas. In order to control internal combustion engine 10, an engine control unit 14 is provided, which, first of all, controls the amount of fuel supplied to internal combustion engine 10 via a fuel meter 13 and, secondly, is supplied the signals of air mass meter 12 and of a first exhaust gas analyzer probe 15 situated in exhaust duct 16, in front of emission control system 17, as well as of a second exhaust gas analyzer probe 18 situated in exhaust duct 16, in back of emission control system 17. Exhaust gas analyzer probe 15 determines an actual lambda value of a fuel-air mixture supplied to internal combustion engine 10 and is part of a lambda control loop assigned to internal combustion engine 10. It may take the form of a wide-range lambda probe or linear lambda probe. Second exhaust gas analyzer probe 18 determines the composition of the exhaust gas downstream from emission control system 17. Second exhaust gas analyzer probe 18 may take the form of a step change probe or binary probe.

During a preconditioning, internal combustion engine 10 is driven at a rich air-to-fuel ratio ($\lambda<1$) to determine the oxygen storage capacity of emission control system 17. In this context, the oxygen is completely removed from emission control system 17. The end of the preconditioning is achieved, when second exhaust gas analyzer probe 18 indicates the breakthrough of rich exhaust gas. In a following measuring phase, internal combustion engine 10 is driven at a lean air-to-fuel ratio ($\lambda>1$). The lean exhaust gas arrives at emission control system 17 with a slight delay, and the oxygen contained in it is stored there. The end of the measuring phase is reached, when the second exhaust gas analyzer probe 18 situated in back of the catalytic converter signals the breakthrough of the lean mixture. The integrated oxygen input during the measuring phase corresponds to the oxygen storage capacity of emission control system 17 and may be used for monitoring the correct functioning of emission control system 17.

Figure 2:
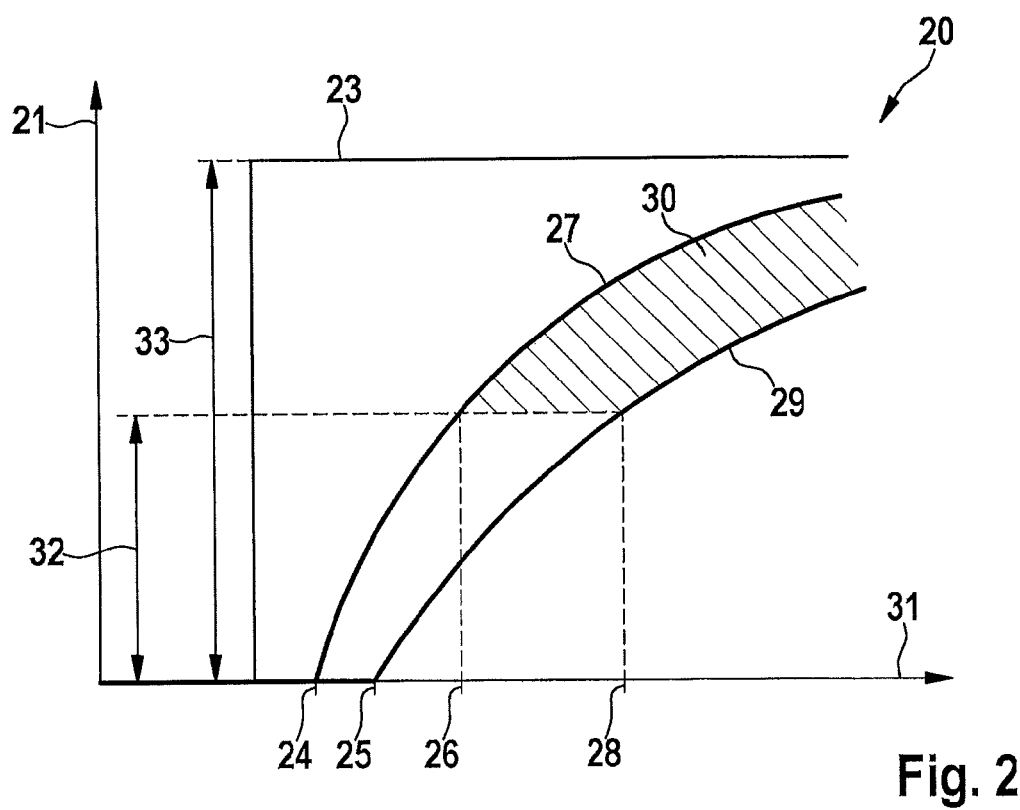
FIG. 2 shows a graph including signal characteristics in the case of a sudden change in lambda.

In a graph 20, FIG. 2 shows signal characteristics at different dynamic responses of an oxygen sensor, such as one of the exhaust gas analyzer probes 15, 18 from FIG. 1. A lambda characteristic 23 including a step change from a low lambda value less than 1 to a high lambda value greater than 1 is drawn into diagram 20, along a time axis 31 and along a signal axis 21. For purposes of orientation, a line having a lambda=1 value 22 is drawn in. In response to the sudden change in the air-fuel mixture supplied to internal combustion engine 10 in accordance with lambda characteristic 23, a lambda characteristic subject to a path delay $T_n$ and a path time constant $\tau_n$ is generated at the location of first oxygen sensor 15, in accordance with a first lambda signal 27. First lambda signal 27 increases as of a first time 24 and crosses lambda=1 value 22 at a third time 26. Both first-time 24 and third time 26 are situated after the sudden increase in lambda characteristic 23. The path of first lambda signal 27 may be described by the formula:

$$f(t)_n = \Delta\lambda \cdot \left(1 - e^{\frac{t-T_n}{\tau_n}}\right)$$

In this connection, $\Delta\lambda$ is the magnitude of a second lambda increase 33. The model describes a delay behavior (PT1 behavior). In the case of a real, first exhaust gas analyzer probe 15, a probe delay $T_s$ and a probe time constant $\tau_s$ must be considered as the dynamic response of first exhaust gas analyzer probe 15, which means that a second lambda signal 29 is measured as an output signal of first oxygen sensor 15. The second lambda signal obeys the formula $$f(t)_s = \Delta\lambda \cdot \left(1 - e^{\frac{t-(T_s+T_n)}{\tau_s+\tau_n}}\right)$$

The simplification of equating a multiplicative model PT2 ($PT1_{path} * PT1_{probe}$) with a PT1 model ($PT1_{(path+probe)}$) may be carried out here, since the path parameters path delay $T_n$ and path time constant $\tau_n$ are small compared with the probe parameters probe delay $T_s$ and probe time constant $\tau_s$.

The output signal of the oxygen sensor for determining the oxygen or hydrocarbon gas storage capacity may cease to be recorded, when 95% of the target lambda value is reached. According to the formulas above, this is the case after three times the respective time constant.

Third time 26 $t_{ns}$, at which integration of the oxygen loading must begin, may be determined from the path of first lambda signal 27, a normalized, actual lambda characteristic. The following applies there:

$$f(t_{ns})_n = \Delta\lambda \cdot \left(1 - e^{\frac{t-T_n}{\tau_n}}\right) = h_0$$

In this connection, $h_0$ corresponds to the magnitude of a first lambda increase 32. Thus, the following applies:

$$t_{ns} = \tau_n \cdot \ln\frac{h_0}{\Delta\lambda} + T_n$$

The fourth time 28 $t_{ss}$, as of which an integration of the oxygen loading must begin in the event of measurement by an exhaust gas analyzer probe provided with dynamic response characteristics, may be determined from the path of second lambda signal 29, the measured lambda characteristic. The following applies here:

$$f(t_{ss})_s = \Delta\lambda \cdot \left(1 - e^{\frac{t-T_s-T_n}{\tau_s+\tau_n}}\right) = h_0$$

$$t_{ss} = (\tau_s + \tau_n) \cdot \ln\frac{h_0}{\Delta\lambda} + T_s + T_n$$

The area $S_s$ under second lambda signal 29, which denotes oxygen input OSC, may be determined as follows:

$$S_s = \int_{t_{ss}}^{3\tau_s} f(t)_s \cdot ml\, dt$$

$$= \int_{t_{ss}}^{3\tau_s} \Delta\lambda \cdot \left(1 - e^{\frac{t-T_s-T_n}{\tau_s+\tau_n}}\right) \cdot ml\, dt$$

$$= \left[\Delta\lambda \cdot \left(1 + \frac{1}{\tau_s} \cdot e^{\frac{t-T_s-T_n}{\tau_s+\tau_n}}\right)\right]_{t_{ss}}^{3\tau_s} \cdot \int_{t_{ss}}^{3\tau_s} ml\, dt$$

where ml denotes the mass flow rate of oxygen, which may be estimated as 23% of the mass flow rate of air.

The area $S_n$ of the oxygen input under first lambda signal 27 may be determined as follows:

$$S_n = \int_{t_{ns}}^{3\tau_s} f(t)_n \cdot ml\, dt$$

$$= \int_{t_{ns}}^{3\tau_s} \Delta\lambda \cdot \left(1 - e^{\frac{t-T_n}{\tau_n}}\right) \cdot ml\, dt$$

$$= \left[\Delta\lambda \cdot \left(1 + \frac{1}{\tau_s} \cdot e^{\frac{t-T_n}{\tau_n}}\right)\right]_{t_{ns}}^{3\tau_s} \cdot \int_{t_{ns}}^{3\tau_s} ml\, dt$$

Correction $\Delta OSC$ may be determined from areas $S_s$ and $S_n$ as follows:

$$\Delta OSC = S_s - S_n$$

The correction to be made in accordance with the present invention is indicated in FIG. 2, using a differential area 30 represented by hatching. With the aid of correction $\Delta OSC$, the oxygen input for emission control system 17 may also be correctly determined when a dynamic error, in some instances, an asymmetric dynamic error, of first exhaust gas analyzer probe 15 is present. The oxygen discharge for emission control system 17 may also be correctly determined in an analogous manner. Consequently, the comparison of oxygen input and discharge (OSC/RSC comparison) may be used for control, adaptation, as well as for diagnostic purposes. An error in a balanced lambda modulation, and thus, a shift in the average lambda value, may be prevented.

In one further refinement of the example method, correction $\Delta OSC$ is determined during an application phase and stored in characteristics maps as a function of a dynamic value of first exhaust gas analyzer probe 15, an average mass flow rate of exhaust gas, and the magnitude of second lambda increase 33. During operation of the internal combustion engine, correction $\Delta OSC$ is then taken from the characteristics maps determined in this manner.

What is claimed is:

1. A method for determining an oxygen storage capacity of an emission control system in an exhaust duct of an internal combustion engine, having a first exhaust gas analyzer probe situated in front of the emission control system in a direction of flow and a second exhaust gas analyzer probe situated in back of the emission control system, the method comprising:
   in a first phase, operating the internal combustion engine using an air-fuel mixture having a rich ($\lambda < 1$) air-to-fuel ratio;
   in a second phase, operating the engine at a lean ($\lambda > 1$) air-to-fuel ratio; and
   determining, using an electronic controller, an oxygen storage capacity of the emission control system from an oxygen input into the emission control system during the second phase;
   wherein parameters of a step response of an output signal of the first exhaust gas analyzer probe is determined based on a sudden change in a lambda value of the air-fuel mixture supplied to the internal combustion engine, and the oxygen input is corrected using the parameters of the step response; and
   wherein the output signal of the first exhaust gas analyzer probe is represented by a function of the form $f(t) \sim 1 - \exp((t-T)/\tau)$, and a delay time T and a time constant $\tau$ are determined as parameters of the step response.

2. The method as recited in claim 1, wherein the delay time T is divided up into a sum of a path delay $T_n$ and a probe delay $T_s$, and the time constant $\tau$ is divided up into a sum of a path time constant $\tau_n$ and a probe time constant $\tau_s$; the path delay $T_n$ and the path time constant $\tau_n$ describing a dynamic response of a conveyance of gas from a supply-air side of the engine to at least one of the first exhaust gas analyzer probe and the second exhaust gas analyzer probe; and the probe delay $T_s$ and the probe time constant $\tau_s$ describing the dynamic response of the at least one of the first exhaust gas analyzer probe and the second exhaust gas analyzer probe.

3. The method as recited in claim 1, wherein the correction of the oxygen input is calculated from a difference of areas under a first function $f_1(t) \sim 1 - \exp((t-T)/\tau)$ including a sum of the delays $T_n + T_s$ and a sum of the time constants $\tau_n + \tau_s$ and under a second function $f_2(t) \sim 1 - \exp((t-T)/\tau)$ including the delay $T_n$ and the time constant $\tau_n$.

4. The method as recited in claim 3, wherein a time period from reaching lambda=1 for a first time to three times the probe time constant $\tau_s$ is used for determining the area under the first and the second function.

5. The method as recited in claim 4, wherein a beginning of the area determination for the first function $f_1(t)$ is determined to be $$t_{ss} = (\tau_s + \tau_n) \cdot \ln\frac{h_0}{\Delta\lambda} + T_s + T_n,$$

and a beginning of the area determination $t_{ns}$ for the second function $f_2(t)$ is determined to be $$t_{ns} = \tau_n \cdot \ln\frac{h_0}{\Delta\lambda} + T_n,$$

where $h_0$ denotes a difference between the lambda value of the air-fuel mixture supplied to the internal combustion engine during the first phase and lambda=1, and where $\Delta\lambda$ denotes the difference between the lambda value of the air-fuel mixture supplied to the internal combustion engine during the first phase and the second phase.

6. The method as recited in claim 1, wherein a reaction time to an abrupt change in the lambda value of the air-fuel mixture supplied to the internal combustion engine from lean to rich is determined as a parameter of the step response of the second exhaust gas analyzer probe, and a time between falling below a first predetermined threshold value in the range above lambda=1 and falling below a second predetermined threshold value in a range below lambda=1 in response to an abrupt change in the lambda value of the air-fuel mixture supplied to the internal combustion engine from lean to rich is determined as a time constant; and the oxygen discharge is corrected using the reaction time and the time constant.

7. The method as recited in claim 1,
   wherein a correction of at least one of the oxygen input and an oxygen discharge is determined as a function of a probe delay $T_s$ and a probe time constant $\tau_s$ of the first exhaust gas analyzer probe, of an average mass flow rate of exhaust gas, and of a magnitude of a lambda increase of an air-fuel mixture supplied to the internal combustion engine in the first phase and the second phase, and stored in characteristics maps, and the at least one of the oxygen input and the oxygen discharge during operation of the internal combustion engine is taken from the characteristics maps.

8. A device for determining an oxygen storage capacity of an emission control system in an exhaust duct of an internal combustion engine, comprising:

a first exhaust gas analyzer probe situated in front of the emission control system in a direction of flow;

a second exhaust gas analyzer probe situated in back of the emission control system; and an engine control unit assigned to the internal combustion engine, the engine control unit including at least one of a circuit and a program sequence, with the aid of which an air-fuel mixture supplied to the engine is controlled in such a manner, that in a first phase, the internal combustion engine is operated using an air-fuel mixture having a rich ($\lambda<1$) air-to-fuel ratio, and in a second phase, the engine is operated at a lean ($\lambda>1$) air-to-fuel ratio, and that an oxygen storage capacity of the emission control system is determined from an oxygen input into the emission control system during the second phase;

wherein a further at least one of a circuit and program sequence for determining parameters of a step response of an output signal of the first exhaust gas analyzer probe, based on an abrupt change in a lambda value of the air-fuel mixture supplied to the internal combustion engine is provided in the engine control unit, and a program sequence for correcting the oxygen input using the parameters of the step response, is provided in the engine control unit; and wherein the output signal of the first exhaust gas analyzer probe is represented by a function of the form $f(t) \sim 1 - \exp((t-T)/\tau)$, and a delay time T and a time constant $\tau$ are determined as parameters of the step response.

9. A device for determining an oxygen storage capacity of an emission control system in an exhaust duct of an internal combustion engine, comprising:

a first exhaust gas analyzer probe situated in front of the emission control system;

a second exhaust gas analyzer probe situated in back of the emission control system; and an engine control unit assigned to the internal combustion engine, the engine control unit including at least one of a circuit and a program sequence, with the aid of which an air-fuel mixture is supplied to the engine is controlled in such a manner, that in a first phase, the internal combustion engine is operated at a lean ($\lambda>1$) air-to-fuel ratio, and in a second phase, the engine is operated at a rich ($\lambda<1$) air-to-fuel ratio, the engine control unit including a program sequence for determining a hydrocarbon gas storage capacity from an oxygen discharge from the emission control system, wherein a further at least one of a circuit and program sequence for determining parameters of a step response of an output signal of the oxygen discharge, using the parameter of the step response, is provided in the engine control unit;

wherein the output signal of the first exhaust gas analyzer probe is represented by a function of the form $f(t) \sim 1 - \exp((t-T)/\tau)$, and a delay time T and a time constant $\tau$ are determined as parameters of the step response.

* * * * *